Patented Nov. 15, 1932

1,887,686

UNITED STATES PATENT OFFICE

DANIEL JOSEPH KENNEDY, OF VANCOUVER, BRITISH COLUMBIA, CANADA

TREATMENT OF COFFEE

No Drawing.   Application filed December 22, 1931. Serial No. 582,641.

My invention relates to improvements in the treatment of coffee which is adapted to preserve and develop the inherent crystalline principles, such as trigonellin, salts of chlorogenic acid, salts of magnesium and calcium phosphate and carbonate of potash, so that with the ash of the coffee which is of an alkaline character and the retention of the carbon dioxide content the high acidity resulting to people using a high protein diet may be largely counteracted.

Certain fatty acids are produced normally in roasting coffee which are harmful to people of delicate digestion and rancidity is also capable of development in coffee prior to its use, which it is my purpose to prevent.

It is also my purpose to inhibit the bacteria and delay the ferments in the caramelized sugar and the dextrinized starch in all coffee as sold in the roasted bean in packages and containers of any kind as well as that sold in bulk, so that the coffee will retain its roaster freshness for much longer periods than coffee roasted in the ordinary way.

The invention consists essentially of roasting the coffee and subjecting it to an open flame and of treating it with an alcohol after cooling, as will be more fully described in the following specification.

I have discovered that the skin of the coffee bean, like the skin of nuts contains certain fatty constituents, which when exposed produce rancidity, which is in time communicated to the berry itself and that if these constituents are destroyed, rancidity in the berry is prevented.

In order to overcome this objectional condition I first place the coffee in a suitable roaster and subject it to heat in the usual way, when it is at the point of maximum expansion or even when the roasting is completed I shut off the roasting flame and project a spray of grain alcohol, rum, brandy or other high volatile alcohol into the coffee, which is preferably done while the roaster is in motion and the coffee is being cascaded. The coffee at this time is at a higher temperature than the flash point of the alcohol sprayed thereover, so that the finely divided alcohol on striking the coffee ignites and subjects its exterior surface and the skin to a localized burning flame, which has the effect of carbonizing those constituents which tend to rancidity and thus permanently destroy them. The heat thus applied is of such a temporary nature as to have no detrimental effect upon the taste of the coffee or in any way impair its aroma, but does appear to enhance both. The amount of alcohol utilized in this step is approximately one and one-half per cent by weight of the weight of coffee, but this will obviously need to vary according to the nature and size of the berry.

When the coffee is cooled, if it is desired to still further enhance the flavour and aroma, it is sprayed while cascading with a further quantity of rum, brandy or any other desired alcohol. The quantity used in this case preferably being one and one-half to three per cent by weight of the weight of the coffee, or such lesser amount as the food laws may require.

The second spraying is carried out at room temperature or less, with a view to preventing the vapourizing of the alcohol and permit the coffee to absorb it. The alcohol so absorbed by the coffee enhances the flavor of the coffee and when the coffee is packed in commercially air-exhausted cans it serves to destroy bacteria, which may be present in the residual air in such cans.

It will thus be seen that I have produced a coffee which from the standpoint of a beverage is healthful, beneficial, nutritious and satisfying and is also conducive to sound sleep, also that by preventing rancidity alone the flavour is enhanced and that by preventing rancidity and subjecting the finished roast to an alcohol impregnation, the flavour will be still further enhanced while producing other highly beneficial chemical changes.

What I claim as my invention is:

1. The treatment of coffee which consists of roasting it to substantially the point of maximum expansion and subjecting it to a burning flame for a few moments.

2. The treatment of coffee which consists of roasting it to substantially the point of maximum expansion, of subjecting it to a spray of an alcohol, and igniting said alcohol.

3. The treatment of coffee which consists of roasting it and raising its temperature to or above the flash point of an alcohol, and of spraying it with an alcohol whereby the spirit is ignited and substantially consumed upon the surface of the coffee.

4. The treatment of coffee which consists of roasting it and subjecting it while hot to a temporary scorching heat, of allowing the coffee to cool and of subjecting it to an alcohol.

5. The treatment of coffee which consists of roasting it and subjecting it while hot to a temporary scorching heat, of allowing the coffee to cool and of spraying it with an alcohol.

6. The treatment of coffee which consists of roasting it and subjecting it while hot to a temporary scorching heat, of allowing the coffee to cool and of spraying it when at room or lower temperatures with an alcohol.

7. The treatment of coffee which consists of roasting it and subjecting it while hot to a temporary scorching heat, of allowing the coffee to cool and of spraying it when at room or lower temperatures with an alcohol in the proportion of one and one-half per cent by weight of alcohol to the weight of the coffee.

Dated at Washington, D. C. this 22nd day of December, 1931.

DANIEL JOSEPH KENNEDY.